United States Patent

[11] 3,633,165

[72] Inventor Edward O. Gilbert
Ann Arbor, Mich.

[21] Appl. No. 885,035
[22] Filed Dec. 15, 1969
[45] Patented Jan. 4, 1972

[73] Assignee Applied Dynamics, Inc.
Ann Arbor, Mich.

[54] ANALOG DATA TRANSMISSION SYSTEM
10 Claims, 1 Drawing Fig.

[52] U.S. Cl. .......... 340/147, 340/152, 307/253
[51] Int. Cl. .......... H04q 5/00, H04q 11/00
[50] Field of Search .......... 340/147 LP, 147, 152; 307/253

[56] References Cited

UNITED STATES PATENTS

| | | | |
|---|---|---|---|
| 2,935,627 | 5/1960 | Schneider | 340/147 LP |
| 3,288,919 | 11/1966 | Abbott et al. | 340/147 LP |
| 3,300,758 | 1/1967 | Hawley | 340/147 LP |
| 3,311,881 | 3/1967 | Mellott | 340/147 LP |
| 3,526,757 | 9/1970 | Rees et al. | 340/147 LP |

*Primary Examiner*—Harold I. Pitts
*Attorney*—Richard G. Stephens

ABSTRACT: A multiplicity of remote analog signal-transmitting devices which time share a direct-current analog bus each include electronic switching within a feedback amplifier loop so that loop gain removes error due to switch voltage drop. Operation of the electronic switching when a given amplifier is not controlling the bus isolates the amplifier terminal connected to the bus from any power supply or signal voltages of the amplifier and allows the amplifier to present a high impedance load to any other signal-transmitting device then controlling the bus.

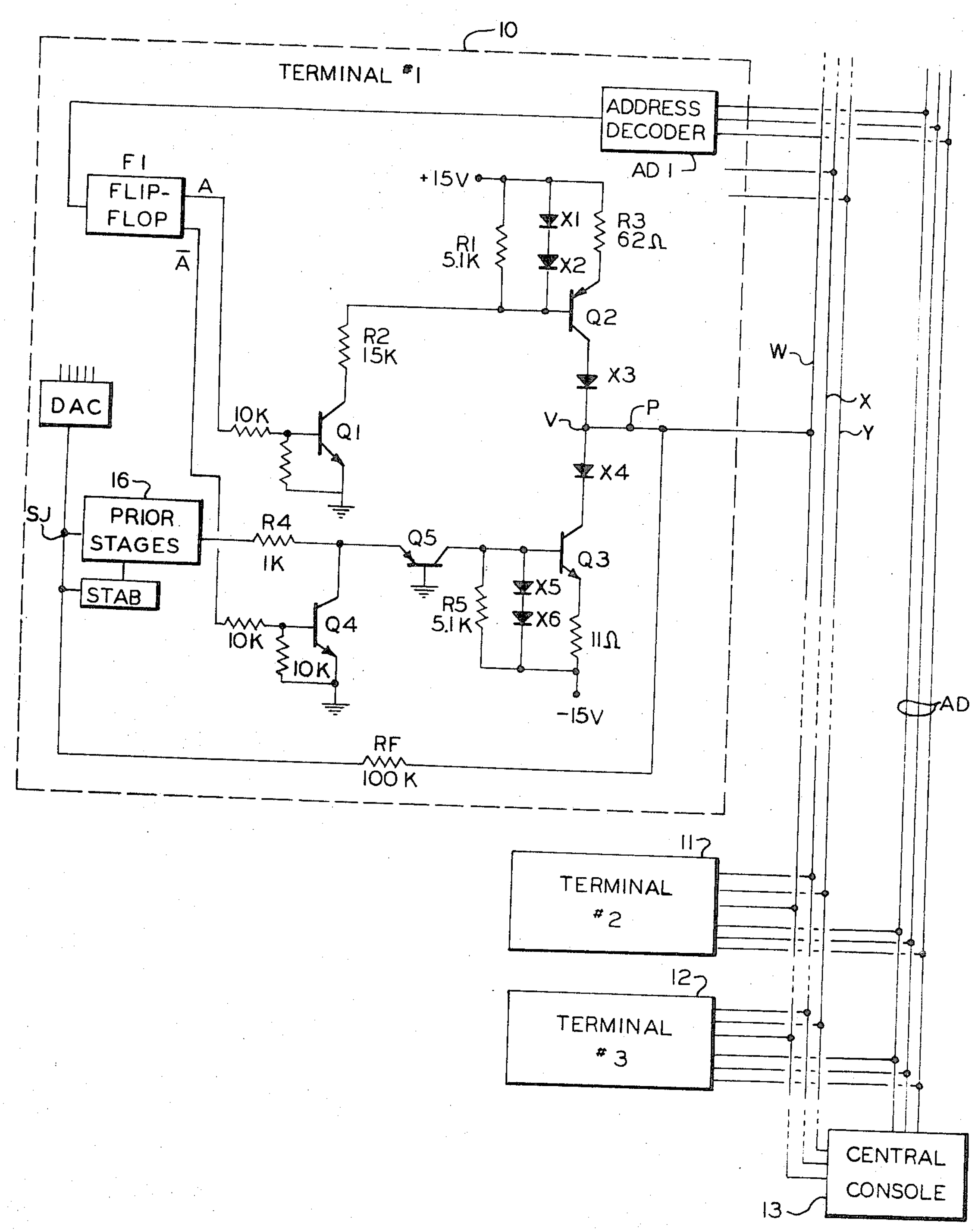
INVENTOR.
EDWARD O. GILBERT
BY Richard D. [signature]

ANALOG DATA TRANSMISSION SYSTEM

A variety of electronic computer, automatic control and instrumentation systems either require or desirably include arrangements in which direct-current analog signals from a multiplicity of remote terminals must be transmitted over a plurality of bus wires time shared by the remote terminals to a central computer console or like device which is time shared among the remote terminals. When a given one of the remote terminals applies an analog signal to a bus wire, it is necessary that no other terminal simultaneously apply a voltage to the same bus wire, and it is highly desirable that each terminal present little or no load to the bus when another terminal is applied a signal to the bus, in order that a large number of terminals can share the same bus without requiring high output currents from each terminal when it drives the bus. It is a primary object of the present invention to provide an improved direct-current analog signal multiplexing system in which signals from a multiplicity of separately located sources may be individually and successively transmitted from one source to another or to a central computer console or similar device, over a bus conductor common to all of the separate sources, in an arrangement such that only one such source will control the signal on the bus conductor at any one time, without interaction with the signals from the other sources. An attendant object is to provide such a system in which the sources which are not driving the bus conductor at a given time present high impedances, or minimum load, to the source which is driving the bus conductor at the given time.

It is frequently desired that the analog signals drive an operational amplifier or other analog computer apparatus located in the central computer. In some such applications it is intended that different numbers of the remote terminals share the central computer at different times, and desirable that power be shut off at each remote terminal when it is not being used without affecting the operation of the remaining, operating terminals. These problems are typified by systems such as those shown in appl. Ser. No. 780,446 filed Dec. 2, 1968 by Elmer G. Gilbert and assigned to the same assignee as the present invention. Appl. Ser. No. 780,446 illustrates arrangements wherein a multiplicity of remote terminal units operated by different students time share an analog computer, with the computer furnishing problem solutions to successive terminal units at a high switching rate, changing from one terminal to the next every six milliseconds or so, for example.

It is possible to extend a line from the summing junction of an amplifier in the central computer to each of the remote terminals so that a current is transmitted to the central amplifier from a current source, such as a potentiometer or DAC (digital-to-analog converter) located in the terminal having control of the console at a given time. If the current source produces an accurately determined amount of current, the voltage drop across a switch connected between the current source and the bus will not interfere with the accuracy of the amount of current transmitted. Such an arrangement is frequently very disadvantageous because the noise induced in long summing junctions leads is greatly amplified and because the stray capacity of long summing junction leads may seriously degrade the amplifier stability and dynamic response. It is one object of the present invention to provide an improved direct-current analog signal multiplexing system wherein signals from a multiplicity of separately located sources may be accurately transmitted to a central console or device over a common bus conductor without the use of a long summing junction lead running from the device to each of the separately located sources.

It is possible to avoid the use of long summing junction leads by transmitting voltages rather than currents to the central console, such as by providing an output amplifier at each terminal and an electronic switch at each remote terminal in series with the amplifier output, i.e., in between the amplifier output terminal and the bus. Such an arrangement has the disadvantage that the "on" or closed resistance of the electronic switch causes a voltage drop which interferes with the accuracy of the transmitted signal. The error due to the electronic switch voltage drop is unknown in the case of most electronic switches, and varies with the level of the signal being transmitted, and usually also varies inversely with temperature. While certain electronic switches can include auxiliary circuitry to overcome some of these causes of error, they become complex and expensive. The mentioned sources of error have prevented satisfactory use of simple and economical field effect transistor ("FET") switches in such arrangements. While electromechanical relays having sufficiently low closed resistance are available, their slow operating speed makes them very unsuitable for various applications where signals must be multiplexed at high switching rates. Thus it is another object of the invention to provide an improved direct-current analog signal multiplexing system which provides switching at electronic switching speeds without the use of an electronic switch connected in series between each signal source and the common bus conductor.

In a number of electronic switching applications it is possible to overcome the error caused by the voltage drop across an electronic switch by connecting the switch inside the loop of a high-gain operational amplifier. While such a technique reduces the error due to the drop across the switch by a factor equal to the loop gain of the amplifier, and hence reduces the error substantially to zero, a number of electronic switches, including simple FET switches, cannot be conveniently utilized in the output stage of an amplifier, because the output voltage swing of the amplifier will erroneously turn the switch on and off unless the control signals applied to the FET gate lead are both greater in magnitude than the full output voltage range of the amplifier, which requires voltages greater than the usual amplifier power supply voltages and requires expensive field-effect transistors. It is another object of the invention to provide an improved multiplexing system wherein expensive components or additional power supplies are not required. A FET switch (or any other switch) having a low-voltage rating cannot be used at an early stage of the amplifier where voltage swings are small, because opening such a switch still leaves a DC voltage applied to the amplifier output terminal and the bus to which it is connected. Various techniques which are useful when AC analog signals are multiplexed are of no value in the case of DC analog signals.

Whether a FET switch at a remote terminal is used within or outside the feedback loop of an operational amplifier, it has not been possible to utilize such switches in remote terminals where the power is turned off, since a usual FET closes, or conducts, when its gate-to-source voltage becomes zero, so that turning off all power at various remote terminals would result in the shutoff terminals being connected by their closed FET switches to various bus wires, so that they would provide undesirable added loads on the bus wires for the remaining active terminals. It is a further object of the invention to provide an improved multiplexing system of the type mentioned wherein each remote unit will present high impedance and minimum load on the bus conductor even when all power is turned off at the remote unit.

Other objects of the invention will in part be obvious and will, in part, appear hereinafter.

The invention accordingly comprises the features of construction, combination of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawing, in which:

The single drawing FIGURE is an electrical schematic diagram, partially in block form, illustrating a preferred embodiment of the invention.

In the drawing the connection of one analog output from one remote terminal No. 1 to an analog bus wire W is shown within dashed lines at 10. Other remote terminals, such as those shown in block form at 11 and 12 may connect similarly to bus W, which is shown connected to a central console or computer shown at 13. In many installations a fairly large number (e.g., 16) of remote terminals all may be connected to bus W. Although the FIGURE shows a single analog signal being connected to a single analog bus wire, in many installations each remote terminal may provide a multiplicity of analog output signals, a multiplicity of separate bus wires may be provided, and each analog output at each terminal may connect to one bus wire in a manner similar to that shown. Two additional analog bus wires are shown at X and Y. Though not shown in the drawing, at least one ground wire, and frequently a number of bus wires carrying Boolean or logic signals also extend from the central console to each of the remote terminals. Though power supply lines also may extend from a common power supply to each of the terminals, in many installations it is desirable that each remote terminal contain its own separate power supply.

A plurality of address bus lines (shown as comprising only three lines at AD) carry logic signals forming an address which specifies which terminal shall control the analog bus wires at any given time. The address is decoded at each remote terminal to provide a logic signal indicating when a given terminal has access to, or control over, the analog bus wires. When the address on lines AD specifies terminal No. 1, an output from address decoder AD1 sets flip-flop F1. When the address on lines AD specifies any other remote terminal, flip-flop F1 is reset. When flip-flop F1 is set, so that terminal No. 1 is given control over the analog bus wires W, X, Y etc., line A carries a logic 1 signal, assumed to be approximately +5 volts, and line $\bar{A}$ carries a logic 0 signal, assumed to be 0 volts. When flip-flop F1 is reset, line A carries zero volts and line $\bar{A}$ carries +5 volts.

The analog signal to be applied to bus W by terminal No. 1 when terminal No. 1 is given control over the analog bus wires is assumed to emanate from a digital-to-analog converter DAC, and to be connected to the summing junction SJ of the DC output amplifier shown in the FIGURE. The amplifier comprises a plurality of conventional direct-coupled operational amplifier stages shown merely as block 16, together with the output stage shown in detail, and includes feedback resistance RF. The amplifier typically has a DC gain of the order of $10^6$ to $10^8$ and is drift stabilized in conventional manner by a chopper stabilizer indicated in block form at STAB. When flip-flop F1 is set, the 0 volt signal on line $\bar{A}$ results in transistor Q4 being cut off. The analog signal from the DAC is amplified by stages 16 and applied via resistor R4 to the emitter of Q5, which is connected as a conventional grounded-base amplifier and acts as a level shifter to drop the always positive voltage applied to the Q5 emitter from stages 16 to a negative signal to drive the base of transistor Q3. The signal on the Q5 collector is applied to the base of transistor Q3. Transistor Q5 has a low input impedance, a high output impedance, and voltage and current gains slightly less than unity. Resistor R4 converts the output voltage of stages 16 to a current to drive Q5. The Q5 collector current flowing through resistor R5 provides a positive base-to-emitter bias on Q3, which acts as a class A amplifier.

When flip-flop F1 is set the +5 volt signal on line A turns on transistor Q1, so that current flows from the +15 volt supply through resistor R1 and diodes X1 and X2, through resistor R2 and through Q1 to ground. The constant forward voltage drop (approximately 1.4 volts) across diodes X1 and X2 provides a constant base-emitter bias to Q2, and hence a constant current flows through resistor R3, transistor Q2 and diode X3. Transistor Q3 acts as a common-emitter amplifier with Q2 acting as its collector load resistor. When the output voltage on line V is positive, a portion of the Q2 collector current flows out to bus W and through the various loads connected to bus W at the other remote terminals and at the central console. When the output voltage on line V is zero all of the Q2 collector current flows downwardly through diode X4 and transistor Q3, and when line V is negative, the constant current from Q2 and the current flowing inwardly from bus W flow through diode X4 and transistor Q3 to the −15 volt supply. Because of the high gain in stages 16 and Q3, providing high loop gain in the loop comprising stages 16, resistor R4, transistor Q5, transistor Q3, diode X4 and feedback resistor RF, the voltage drop across resistor R4 and the less-than-unity gain of transistor Q5 do not appreciably affect the output voltage on line V. Thus the output stage has very low output impedance, and none of the error which arises in prior systems wherein a FET switch or the like is inserted in series with the output line (between line V and bus W).

When power in terminal 1 is turned on, but control over the analog bus lines has been given to a different remote terminal so that flip-flop F1 is reset, the +5 volt signal on line $\bar{A}$ turns on transistor Q4, thereby pulling the Q5 emitter down to a low voltage (approximately +0.2 volt), essentially shorting one end of resistor R4 to ground, so that no appreciable portion of the signal from stages 16 reaches the Q5 emitter, and so that Q5 is cutoff. Resistor R4 drops sufficient voltage when Q4 is turned on that the Q5 emitter goes low enough to cut off Q5 even when a maximum (saturation level) output voltage is being provided by stages 16. The cutoff of Q5 eliminates the voltage drop across R5, thereby cutting off Q3. The 0 volt signal on line A cuts off transistor Q1, thereby cutting off transistor Q2. With transistors Q2 and Q3 both cutoff, it will be seen that line V will present a very high impedance and no appreciable load for whichever one of the other remote terminals that may be driving bus W at the time. Thus the only load which terminal No. 1 provides on bus W is that of feedback resistor RF. Since feedback resistor RF is ordinarily very much larger than the resistances used in the collector-emitter circuits of ordinary amplifier output stages, the load presented to the terminal which is driving bus W by terminal No. 1 is very small. The other terminals which are not being addressed also present similar loads, of course, to the driving terminal.

With the signal from stages 16 disconnected from Q5 the amplifier loop is opened. The voltage on line V will be controlled by a different remote terminal, and since the feedback current through RF ordinarily will not equal the input current from the DAC, summing junction SJ will be driven far from its virtual ground operating potential and stages 16 will be driven to saturation. If a drift stabilizer including long time-constant circuits is connected to SJ to stabilize stages 16, it is highly desirable that stages 16 utilize the overload prevention technique shown in prior U.S. Pat. No. 3,456,203, in order that the amplifier be capable of responding without a great time delay.

When all power in terminal No. 1 is turned off, it will be seen that transistor Q2 and Q3 will both be nonconducting, and resistor RF (and the counterpart resistors in the other nondriving terminals) will continue to furnish the only appreciable loads to the terminal which drives bus W at any given instant. It also may be noted that the load (resistance RF) which each terminal connects to an analog bus does not change as power in the terminal is switched on and off, and hence the accuracy of the signals transmitted over the bus in no way depends upon how many of the remote terminals may have power on at a given time. With power turned off in terminal No. 1 the emitter and base of transistor Q2 are at ground potential. Diode X3 isolates Q2 from line W and prevents any current flow from the Q2 collector when another terminal unit drives line W positive. Similarly, the Q3 base and emitter lie at ground potential, and diode X4 prevents any collector current from flowing through transistor Q3 when another terminal unit drives line W negative.

In summary, the system described avoids the disadvantages of the use of long summing junction leads from widely separated terminals by transmitting voltages rather than currents, it avoids the disadvantageous voltage drops which arise from the "on" resistance of switches used in series with the output terminal by doing all switching within the loop of the output amplifier. The switching arrangement utilized as the output stage of the amplifier provides low impedance when the terminal is driving the output bus, yet includes no low resistance connections to the output line, so that a given terminal only lightly loads the bus when a different terminal is driving the bus, irrespective of whether power in the given terminal is turned on or turned off.

While illustrated in connection with a system wherein each of the remote terminal units periodically provides an output signal to a central console device such as an analog computer, the invention is equally applicable to a variety of applications where signals on a bus are not transmitted to a central device, but instead between various of the remote terminals. Also, the central console may include a plurality of output amplifiers of the type shown at terminal No. 1 in order that the central console can transmit analog signals on various time-shared busses to various of the remote terminals.

Various changes to the specific circuit shown will become readily apparent to those skilled in the art as a result of this disclosure. Transistors Q2 and Q3 could be operated in inverted configuration if desired. With altered biasing field-effect transistors could be used at Q2 and Q3, with no apparent appreciable advantage. A level shifter circuit, such as that shown at Q5 is required only where the quiescent level of the prior stages 16 is approximately 0, as has been assumed, and those skilled in the art will recognize that level shifting, when required, can be accomplished by a variety of alternative techniques. Also, a series switch, such as a conventional FET switch, could be used in lieu of the shunt switch shown at Q4. Also, a series FET switch could be used in series with the Q5 collector in lieu of Q4.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawing shall be interpreted as illustrative and not in a limiting sense.

The embodiment of the invention in which an exclusive property or privilege is claimed are defined as follows:

I claim:

1. An analog signal multiplexing system, comprising, in combination: a plurality of analog signal-deriving means; a bus conductor; means for providing logic signals to selectively control said analog signal-deriving means to apply successive analog signals from successive ones of said signal-deriving means to said bus conductor, each of said analog signal-deriving means including means for deriving a respective first analog signal and an output amplifier, said output amplifier having an input circuit connected to receive and combine said analog signal and a feedback signal to provide a second signal, first amplifying means for amplifying said second signal, an amplifier output terminal connected to said bus conductor, a first transistor having its collector-emitter circuit connected between said amplifier output terminal and a first terminal of a power supply, a second transistor having its collector-emitter circuit connected between said amplifier output terminal and a first terminal of a power supply, a second transistor having its collector-emitter circuit connected between said amplifier output terminal and a second terminal of said power supply, first switching means responsive to one of said logic signals for selectively either applying the output signal from said first amplifying means to the base of said first transistor or cutting off said first transistor, second switching means responsive to one of said logic signals for selectively either applying a predetermined current to the base of said second transistor or cutting off said second transistor, and a feedback impedance connected between said amplifier output terminal and said input circuit to apply said feedback signal to said input circuit.

2. A system according to claim 1 wherein said first transistor is connected to be biased in a nonconducting condition in the absence of a signal being applied to its base by said first switching means, and wherein said second transistor is connected to be biased in a nonconducting condition in the absence of said predetermined current being applied to its base, whereby when said transistors are both in a nonconducting condition said feedback impedance comprises the only load connected to said bus conductor by a given analog signal-deriving means.

3. A system according to claim 1 having first and second unidirectional-conducting means respectively connected between said amplifier output terminal and the collector-emitter circuits of said first and second transistors, thereby preventing a voltage on said bus conductor from causing base current flow in either of said transistors when said first switching means cuts off said first transistor and said second switching means cuts off said second transistor.

4. A system according to claim 1 in which said first switching means comprises resistance means connected between said first amplifying means and the base of said first transistor and a third transistor connected as a shunt switch controlled by one of said logic signals to cut off said first transistor by shorting one end of said resistance means to a predetermined potential.

5. A system according to claim 1 in which said first switching means includes a resistance, a third transistor and a fourth transistor, said resistance and the collector-emitter circuit of said third transistor being connected in series between said first amplifying means and the base of said first transistor, the collector-emitter circuit of said fourth transistor being connected between a point of reference potential and the junction between said resistance and the collector-emitter circuit of said third transistor.

6. An amplifier operable controllable by logic signals to either provide an output analog signal on an output conductor or to present a high impedance to said output conductor, comprising, in combination: direct-coupled first amplifying means connected to receive an input signal and a feedback signal and to provide a second signal; a first transistor having its collector-emitter circuit connected between said output conductor and a first terminal of a power supply; a second transistor having its collector-emitter circuit connected between said output conductor and a second terminal of said power supply; first switching means controlled by one of said logic signals for selectively applying or not applying the output signal from said first amplifying means to the base of said first transistor; second switching means controlled by one of said logic signals for selectively applying or not applying a predetermined current to the base of said second transistor; and a feedback impedance connected between said output conductor and said first amplifying means to apply said feedback signal to said first amplifying means.

7. An amplifier according to claim 6 having first and second unidirectional conducting means connected respectively between said output conductor and the collector-emitter circuits of said first and second transistors.

8. An amplifier according to claim 6 having diode means connected between the base and emitter of said second transistor.

9. An amplifier according to claim 6 in which said first and second transistors are of mutually opposite conductivity types.

10. An amplifier according to claim 6 having a first resistance connected between the base of said first transistor and said first terminal of said power supply, and second resistance connected between the base of said second transistor and said second terminal of said power supply.

* * * * *